United States Patent
Zong et al.

(10) Patent No.: US 8,098,481 B2
(45) Date of Patent: Jan. 17, 2012

(54) ENERGY STORAGE DEVICE

(75) Inventors: Linda Zong, San Diego, CA (US);
Xiaomei Xi, Carlsbad, CA (US); Porter Mitchell, San Diego, CA (US); James Borkenhagen, Spring Valley, CA (US); Robert Crawford, Murrieta, CA (US); Michael Everett, Fallbrook, CA (US); Alexandre Fresard, Encinitas, CA (US)

(73) Assignee: Maxwell Technologies, Inc., San Diego, CA (US)

( * ) Notice: Subject to any disclaimer, the term of this patent is extended or adjusted under 35 U.S.C. 154(b) by 0 days.

(21) Appl. No.: 12/300,102

(22) PCT Filed: May 9, 2006

(86) PCT No.: PCT/US2006/017810
§ 371 (c)(1),
(2), (4) Date: Jul. 1, 2009

(87) PCT Pub. No.: WO2007/130059
PCT Pub. Date: Nov. 15, 2007

(65) Prior Publication Data
US 2009/0303659 A1 Dec. 10, 2009

(51) Int. Cl.
*H01G 9/00* (2006.01)

(52) U.S. Cl. .................................... 361/502

(58) Field of Classification Search ............... 361/502
See application file for complete search history.

(56) References Cited

U.S. PATENT DOCUMENTS

| 5,172,307 A | * | 12/1992 | Tabuchi et al. | 361/502 |
| 5,862,035 A | * | 1/1999 | Farahmandi et al. | 361/502 |
| 2003/0086239 A1 | * | 5/2003 | Bendale et al. | 361/502 |
| 2006/0281252 A1 | * | 12/2006 | Oversteyns | 438/253 |

FOREIGN PATENT DOCUMENTS

| EP | 51272 A | * | 5/1982 |
| JP | 07220981 A | * | 8/1995 |
| JP | 12-138052 A2 | | 5/2000 |
| JP | 12-331671 A2 | | 11/2000 |
| JP | 13-102031 A2 | | 4/2001 |
| WO | WO 2004084246 A1 | * | 9/2004 |

OTHER PUBLICATIONS

ISR completed by KIPO Feb. 8, 2007, PCT/US2006/017810. International Searching Authority; Korean Intellectual Property Office; Written Opinion of the International Searching Authority (Form PCT/ISA/237) for International application No. PCT/US2006/017810; Feb. 8, 2007; 4 pages.
International Searching Authority; Korean Intellectual Property Office; International Search Report (Form PCT/ISA/210) for International application No. PCT/US2006/017810; Feb. 8, 2007; 3 pages.

* cited by examiner

*Primary Examiner* — Eric Thomas
(74) *Attorney, Agent, or Firm* — Knobbe Martens Olson & Bear LLP

(57) ABSTRACT

In one embodiment, an energy storage device having a first electrode supported by a first collectors sheet; a second electrode supported by a second collector sheet; and a dielectric separator therebetween, all spirally wound together. A container houses this spiral winding, with the first collector sheet having an end in contact with the base and the second collector sheet having an end oriented towards an opening opposite to the base. A collector plate is interposed between the second collector sheet and the opening and is restrained in position by a crimp in the container. A lid is positioned in the opening and has one side in electrical contact with the collector plate and an opposite side oriented outwardly of the container. The lid is restrained in position by rolling the one or more container walls over the lid.

26 Claims, 3 Drawing Sheets

ENERGY STORAGE DEVICE

TECHNICAL FIELD

The present invention relates to an energy storage device, and, more particularly, to an energy storage device having a reduced number of components.

BACKGROUND ART

Energy storage devices are used throughout modern society to provide energy in a variety of applications, or to intermittently store and release energy, in order to stabilize power supplies. Inclusive of such electro-chemical devices are capacitors, fuel cells, and batteries. In particular, double-layer capacitors, also referred to as ultracapacitors and super-capacitors, are energy storage devices that are able to store more energy per unit weight and unit volume than capacitors made with traditional technology, for example, electrolytic capacitors.

Double-layer capacitors store electrical energy in a polarized electrode/electrolyte interface layer. Double-layer capacitors include two or more electrodes, which are separated from contact by a dielectric separator preventing an electronic (as opposed to an ionic) current from shorting the two electrodes. Both the electrodes and the porous separator are immersed in an electrolyte, which allows flow of the ionic current between the electrodes and through the separator. At the electrode/electrolyte interface, there is formed a first layer of solvent dipole and a second layer of charged species (hence, the name "double-layer" capacitor).

[With each type of energy storage device there are associated positive and negative characteristics, upon which decisions are made as to which device is more suitable for use in a particular application. The overall cost of an energy storage device is one characteristic that can make or break a decision as to whether a particular type of energy storage device is used.

In particular, as the demand for double-layer capacitors is increasing due to high-volume applications, among others, in the automotive, aerospace, hand-tool and power generation industries, a need has arisen to provide double-layer capacitors, and, in general, energy storage devices that combine a high operating reliability and increased power storage capabilities with reduced manufacturing costs.

DISCLOSURE OF INVENTION

In one embodiment, an energy storage device comprises a first electrode in film form that stores a negative charge; a second electrode in film form that stores a positive charge; and a dielectric separator therebetween. A first collector sheet, made of an electrically conductive material, supports the first electrode, and a second collector sheet, also made of an electrically conductive material, supports the second electrode. The combination of the first and second electrodes with the first and second collector sheets, with the dielectric separator therebetween, is spirally wound together, with a free end of the first collector sheet extending from one edge of the spiral winding and a free end of the second collector sheet extending from the opposite edge of the spiral winding.

A container houses this spiral winding and comprises a base and one or more walls defining an opening. The spiral winding is housed inside the container so to have the free end of the first collector sheet contacting the base and the free end of the second collector sheet oriented towards the opening. The spiral winding is immersed in an electrolyte that provides an ionic contact with the first and second electrodes.

A collector plate, shaped to contact the free end of the second collector sheet on one side and oriented towards the opening of the container with the opposite side, is interposed between the free end of the second collector sheet and the opening. The collector plate is restrained in position by a crimp in the one or more container walls and is electrically isolated from the one or more container walls.

A lid is positioned in the opening on the side of the crimp opposite to the collector plate, and has one side in electrical contact with the collector plate and an opposite side oriented outwardly of the container. The lid is restrained in position by rolling the one or more container walls over the side of the lid opposite to the collector plate and is electrically insulated from the one or more container walls.

An electric terminal extends from the lid and is structured to carry current from the second electrode. The terminal is shaped for attachment to an external load and may have a threaded or flush surface.

In other embodiments of the invention, a second terminal extends from the base, and a groove is position on the container surface to absorb overpressures within the container, thereby acting as a safety device.

BRIEF DESCRIPTION OF DRAWINGS

The drawings constitute a part of this specification and include exemplary embodiments of the invention, which may be embodied in various forms. It is to be understood that in some instances various aspects of the invention may be shown exaggerated or enlarged to facilitate an understanding of the invention.

FIGS. 2A and 2B show different views of a "jellyroll" included in the embodiment of FIG. 1, wherein FIG. 2A is a top view and FIG. 2B is a perspective view.

MODES FOR CARRYING OUT THE INVENTION

Detailed descriptions of embodiments of the invention are provided herein. It is to be understood, however, that the present invention may be embodied in various forms. Therefore, the specific details disclosed herein are not to be interpreted as limiting, but rather as a representative basis for teaching one skilled in the art how to employ the present invention in virtually any detailed system, structure, or manner.

Figure 1:
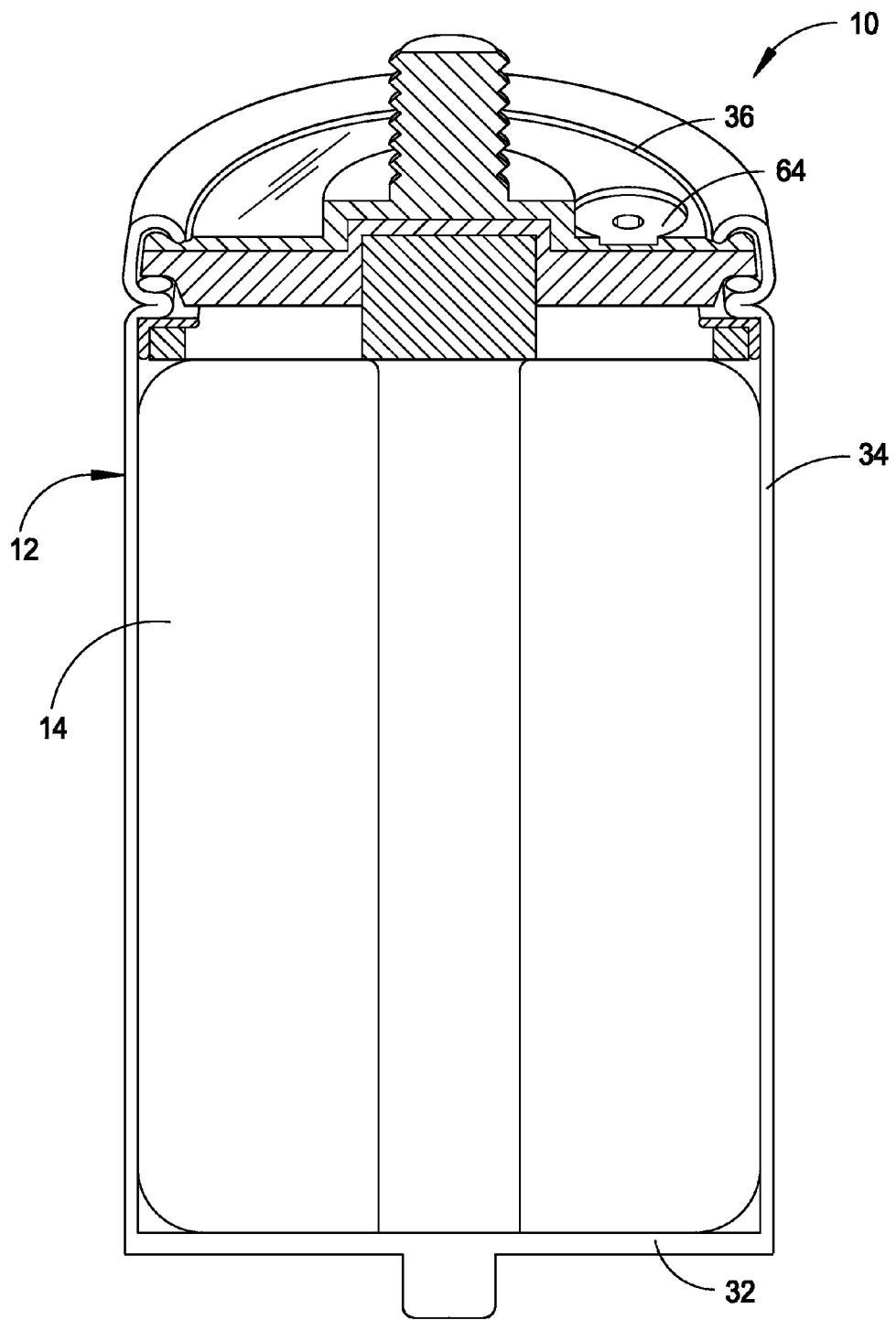
FIG. 1 illustrates a longitudinal cross-section of one embodiment of the invention.

Turning first to FIG. 1, there is shown a first embodiment of the invention. A capacitor 10 comprises a container 12 housing two or more electrodes that are spirally wound together to form what is referred to in the industry as a "jellyroll" 12 and that are immersed in an electrolyte.

Figure 2A:
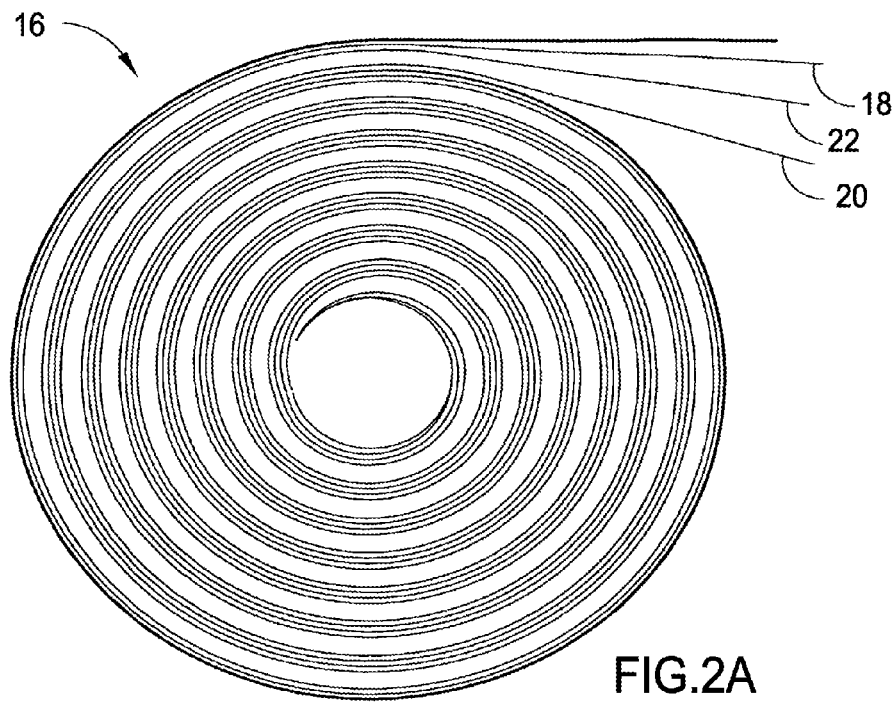
Figure 2B:
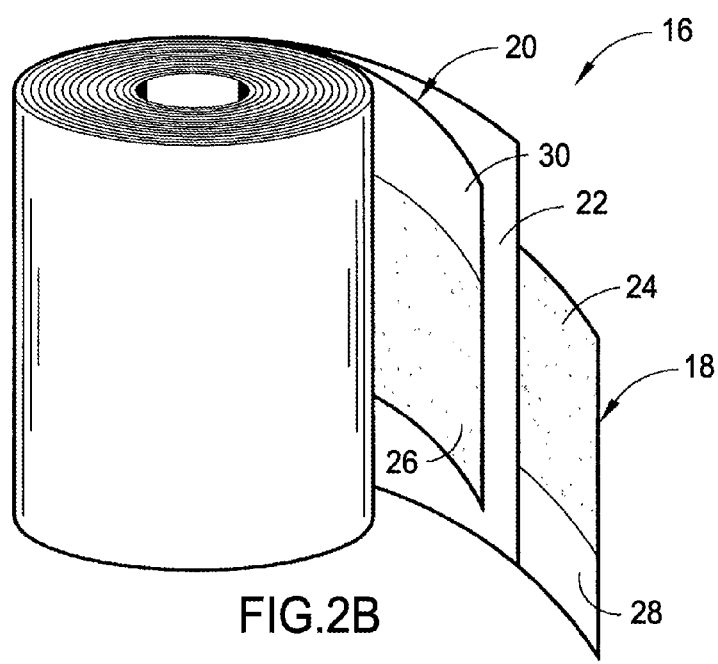

The structure of jellyroll 12 will be better understood with reference to FIGS. 2A-2B, which illustrates a jellyroll 16 having two electrodes, namely a first electrode 18 capable of storing a negative charge and a second electrode 20 capable of storing a positive charge. The first and the second electrode are separated by a dielectric separator 22 (for instance, a porous paper) and, as mentioned, are immersed into an electrolyte that creates an ionic contact with the electrodes.

In one variant of the present embodiment, the first and second electrodes are formed from a combination of activated carbon particles suspended in a binder matrix. Each electrode (identified with reference numerals 24 and 26 in FIG. 2B) is supported by a collector sheet (identified with reference numerals 28 and 30 in FIG. 2B) that is made of a conductive material and that collects the charge from the electrode and transmits a current to a terminal of the capacitor. More particularly, collector sheet 28 carries a negative charge and has a free edge extending beyond carbon particles 24 to define one side end of jellyroll 16. Conversely, collector sheet 30 carries a positive charge and has a free edge extending beyond carbon particles 26 to define the opposite end of jellyroll 16.

Figure 3:
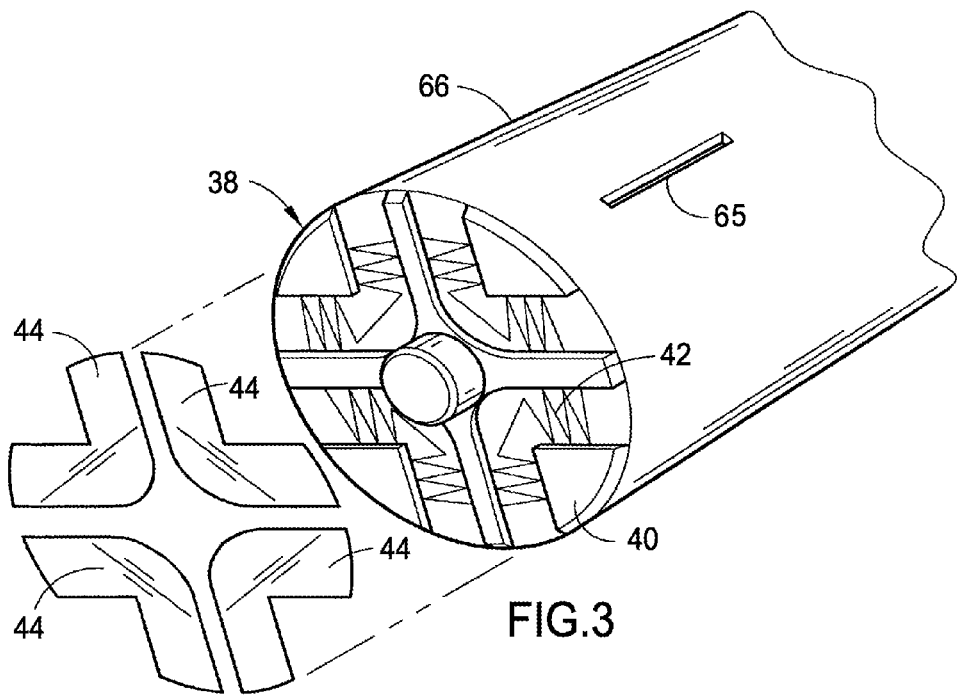
FIG. 3 illustrates a perspective view of the embodiment of FIG. 1, as seen from an angle that includes the base of the container.

Container 12 is typically made of a conductive material, such as a metallic material, and comprises a conductive base 32 and one or more walls 34 that define an opening 36. Jellyroll 14 is inserted into container 12 so to cause the free end of first collector sheet 28 to be in contact with base 32, thereby causing current to flow from first electrode 18 to base 32. In one variant of the present embodiment, the free end of collector 28 is crushed against base 32, so to increase the contact area with base 32, and is further laser-welded to base 32. In another variant of the present embodiment, shown in FIG. 3, base 38 comprises a plurality of grooves 40, within which laser weld lines 42 are positioned. Because laser weld lines 42 may perforate base 38 in certain points, in this variant an epoxy resin is spread over the laser weld lines, and base caps 44 are positioned over the epoxy resin to fill grooves 40.

Figure 4:
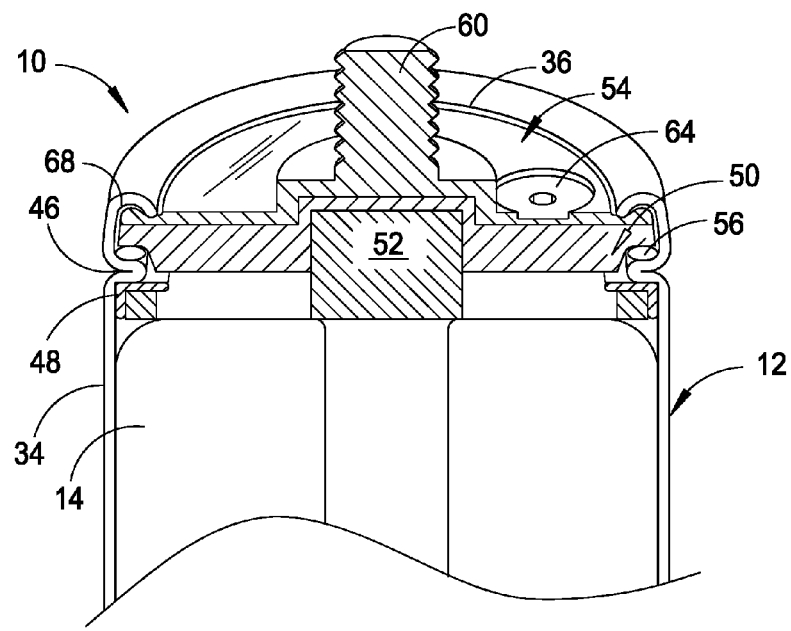
FIG. 4 is a perspective cross-section of the upper part of the embodiment of FIG. 1.

Turning now to FIG. 4, jellyroll 14 is restrained within container 12 by inserting an angular crimp 46 around wall 34. A first isolating ring 48 creates an electrical isolation barrier between the negatively charged wall 34 and the positively charged end of jellyroll 14, thereby preventing an electrical shorting of capacitor 10. In one variant of the present embodiment, isolating ring 48 is made of a fluoro-polymer resin.

Further, a collector plate 50 is positioned in electrical contact with the positively charged end of jellyroll 14, capping jellyroll 14 and being typically laser welded to it. Collector plate 50 exhibits a protrusion 52 extending longitudinally and outwards of container 10, and is also restrained in place by crimp 46.

A lid 54 is positioned within opening 36 and at the end of crimp 46 that is opposite to collector plate 50. Lid 54 is mated to collector plate 50 by means of a cavity on the face of lid 54 facing protrusion 52, said cavity having a diameter that at room temperature is narrower than protrusion 52. When lid 54 is heated, the cavity expands, allowing for the mating with protrusion 52. Upon the cooling of lid 54, the cavity contracts and creates an interference fit with protrusion 52, providing not only for a mechanical connection between collector plate 50 and lid 54, but also for an electrical connection between lid 54 and jellyroll 14.

An O-ring 56 (preferably made from a rubber compound) is positioned between collector plate 50 and the lower edge of crimp 46, in order to create not only an isolating layer between positively charged collector plate 50 and negatively charged crimp 46, but also a sealing barrier that prevents leaks of the electrolyte. Further, a second isolating ring 58 (made from a fluoro-polymer resin in one variant of this embodiment) creates an electrically isolating layer between the combination of collector plate 50 and lid 54 on one side, and wall 34 on the other.

A terminal post 60 extends from lid 54 and is shaped to provide a connection to an external load. Terminal post 60 may have different lengths and diameters, and, in different variants of the present embodiment, may have an external wall that is treaded or smooth.

Finally, lid 54 is restrained into place by rolling one or more walls 34 over lid 54, as shown in FIG. 4. A third isolating ring 68 is positioned between lid 54 and the rolled edge of wall 34, in order to create an electrical barrier between the two.

Container 12 comprises a port 64 for injecting the electrolyte into container 10. Port 64 may be positioned in the lid, as shown in FIGS. 1 and 4, or may be situated in base 32, 38, or elsewhere in container 12. Further, port 64 may be sealed in different ways after inserting the electrolyte. In one variant of the present embodiment, port 64 may be threaded and be sealed by means of a screw, with an O-ring and a washer concentrically positioned between the head of the screw and the lid. In another variant of the present embodiment, port 64 may be sealed by a rivet.

Capacitor 10 may be labeled using different techniques. In one variant of the present embodiment, a label is shrink-wrapped around wall 34, creating, among others, an electrically insulating layer around wall 34. In another variant, a label may be adhesively bonded on wall 34, or wall 35 may be painted with a suitable paint.

One skilled in the art will recognize that a variety of other embodiments of the present invention are possible, all within the scope of the present invention. For instance, in another embodiment, a second terminal post extends from base 32 to provide an easy connection to an external load. Such second terminal post may also be provided in different lengths and diameters, and have an external surface that may be threaded or smooth.

In still another embodiment of the invention, container 12 comprises a groove 65 (shown in FIG. 3) that operates as a safety device by providing a first expansion point of wall 66 in the event of a pressure build-up within container 12, thereby preventing or at least delaying an explosion of capacitor 10.

While the invention has been described in connection with the above described embodiments, it is not intended to limit the scope of the invention to the particular forms set forth, but on the contrary, it is intended to cover such alternatives, modifications, and equivalents as may be included within the scope of the invention.

INDUSTRIAL APPLICABILITY

The present invention finds applicability in all industrial applications where energy storage devices are employed. One such application is the production of electric capacitors, in particular, double layer capacitors.

What is claimed is:
1. An energy storage device comprising:
a first electrode capable of storing an electrical charge, a second electrode capable of storing an opposite electrical charge, and a dielectric separator therebetween, the first and the second electrodes being in film form;
a first collector sheet supporting the first electrode, a second collector sheet supporting the second electrode, each of the first and second collector sheets being electrically conductive, the combination of the first electrode with the first collector sheet, of the dielectric separator, and of the second electrode with the second collector sheet being spirally wound together, a free end of the first collector sheet extending from one edge of the spiral winding and a free end of the second collector sheet extending from the opposite edge of the spiral winding;
a container adapted to house the spiral winding, the container comprising an electrically conductive base and one or more walls defining an opening, the spiral winding being housed in the container so to have the free end of the first collector sheet contacting the base and the free end of the second collector sheet oriented towards the opening;

an electrolyte in ionic contact with the first and second electrodes;

a collector plate shaped to contact the free end of the second collector sheet at one side and oriented towards the opening at the opposite side, the collector plate being interposed between the free end of the second collector sheet and the opening, the collector plate being restrained in position by an inward protrusion of a crimp in the one or more container walls, the inward protrusion of the crimp being between the collector plate and the spiral winding, the collector plate being electrically isolated from the one or more container walls;

the crimp extending upward from the inward protrusion, a lid positioned in the opening on the side of the crimp opposite to the collector plate, the lid having a side in electrical contact with the collector plate and an opposite side oriented outwardly of the container, the lid being restrained in position by rolling the one or more container walls at the other side of the crimp over the side of the lid opposite to the collector plate and being electrically isolated from the one or more container walls; and a first terminal post extending from the lid, the electric terminal being structured to carry current from the second electrode and being shaped for attachment to an external load.

2. The energy storage device of claim 1, wherein the container is cylindrical in shape.

3. The energy storage device of claim 1, wherein the free end of the first collector sheet is welded to the base.

4. The energy storage device of claim 3, wherein the free end of the first collector sheet is laser welded to the base.

5. The energy storage device of claim 4, wherein the outer surface of the base comprises grooves, wherein the laser weld is performed within the grooves, and wherein the grooves are filled with a resin after welding.

6. The energy storage device of claim 5, wherein caps are applied to the grooves after filling with the resin.

7. The energy storage device of claim 1, wherein the collector plate is isolated from the one or more container walls by interposing a first isolating ring between the collector plate and the one or more walls.

8. The energy storage device of claim 7, wherein the first isolating ring comprises a fluoropolymer resin.

9. The energy storage device of claim 1, wherein the side of the collector plate facing the lid has an outwardly extending protrusion, wherein the side of the lid facing the collector plate has a corresponding cavity, and wherein the collector plate and the lid are connected by mating the outwardly extending protrusion with the cavity.

10. The energy storage device of claim 9, wherein the outwardly extending protrusion and the cavity are mated by heating the lid and causing the cavity to expand, thereby causing an interference fit with the outwardly extending protrusion upon contraction of the cavity during the cooling of the cavity.

11. The energy storage device of claim 1, wherein the lid is electrically insulated from the one or more container walls by interposing one or more isolating rings between the lid and the one or more container walls.

12. The energy storage device of claim 11, wherein the one or more isolating rings comprise a compressible O-ring interposed between the lid and the crimp and a second isolating ring.

13. The energy storage device of claim 12, wherein the second isolating ring comprises a fluoropolymer resin.

14. The energy storage device of claim 1, wherein the energy storage device comprises a sealable port suitable for injecting the electrolyte into the container.

15. The energy storage device of claim 14, wherein the sealable port is situated in the lid.

16. The energy storage device of claim 14, wherein the sealable port is situated in the base.

17. The energy storage device of claim 14, wherein the sealable port is threaded and is sealed by mating a suitable screw to the port.

18. The energy storage device of claim 14, wherein the sealable port is closed by a rivet.

19. The energy storage device of claim 1, wherein the first terminal post is threaded.

20. The energy storage device of claim 1, further comprising a second terminal post extending from the base, the second terminal post being structured to carry current from the first electrode and being shaped for attachment to an external load.

21. The energy storage device of claim 20, wherein the second terminal post is threaded.

22. The energy storage device of claim 1, wherein the one or more walls of the container comprise a groove structured to expand at a faster rate than the remainder of the one or more wall upon a pressure increase within the container.

23. The energy storage device of claim 1, further comprising a label wrapping the one or more walls and having electrically insulating properties.

24. The energy storage device of claim 23, wherein the label is shrink-wrapped around the one or more walls.

25. The energy storage device of claim 1, wherein the energy storage device is an electrical capacitor.

26. An energy storage device comprising:
a first electrode capable of storing an electrical charge, a second electrode capable of storing an opposite electrical charge, and a dielectric separator therebetween, the first and the second electrodes being in film form;

a first collector sheet supporting the first electrode, a second collector sheet supporting the second electrode, each of the first and second collector sheets being electrically conductive, the combination of the first electrode with the first collector sheet, of the dielectric separator, and of the second electrode with the second collector sheet being spirally wound together, a free end of the first collector sheet extending from one edge of the spiral winding and a free end of the second collector sheet extending from the opposite edge of the spiral winding;

a container adapted to house the spiral winding, the container comprising an electrically conductive base and one or more walls defining an opening, the spiral winding being housed in the container so to have the free end of the first collector sheet contacting the base and the free end of the second collector sheet oriented towards the opening;

an electrolyte in ionic contact with the first and second electrodes;

a collector plate shaped to contact the free end of the second collector sheet at one side and oriented towards the opening at the opposite side, the collector plate being interposed between the free end of the second collector sheet and the opening, the collector plate being restrained in position by a crimp in the one or more container walls, the collector plate being electrically isolated from the one or more container walls;

a lid positioned in the opening on the side of the crimp opposite to the collector plate, the lid having a side in electrical contact with the collector plate and an opposite side oriented outwardly of the container, the lid being restrained in position by rolling the one or more container walls over the side of the lid opposite to the collector plate and being electrically isolated from the one or more container walls;

a first terminal post extending from the lid, the electric terminal being structured to carry current from the second electrode and being shaped for attachment to an external load;

wherein the free end of the first collector sheet is laser welded to the base;

wherein the outer surface of the base comprises grooves;

wherein the laser weld is performed within the grooves, and wherein the grooves are filled with a resin after welding.

* * * * *